US008695055B2

(12) United States Patent
Labro

(10) Patent No.: US 8,695,055 B2
(45) Date of Patent: Apr. 8, 2014

(54) SPLITTER/COMBINER FOR CATV NETWORKS

(75) Inventor: Marc Labro, Tilff (BE)

(73) Assignee: Teleste Oyj, Littoinen (FI)

( * ) Notice: Subject to any disclaimer, the term of this patent is extended or adjusted under 35 U.S.C. 154(b) by 105 days.

(21) Appl. No.: 13/523,245

(22) Filed: Jun. 14, 2012

(65) Prior Publication Data

US 2013/0002958 A1  Jan. 3, 2013

(30) Foreign Application Priority Data

Jun. 17, 2011   (EP) ..................................... 11397514

(51) Int. Cl.
*H04N 7/173* (2011.01)
(52) U.S. Cl.
USPC ............................. 725/127; 725/126; 725/128
(58) Field of Classification Search
USPC .................................................. 725/126–128
See application file for complete search history.

(56) References Cited

U.S. PATENT DOCUMENTS

| 8,286,209 | B2 * | 10/2012 | Egan et al. ........................ 725/74 |
| 8,561,125 | B2 * | 10/2013 | Alkan et al. ................... 725/153 |
| 2005/0044573 | A1 | 2/2005 | Preschutti |
| 2009/0320086 | A1 * | 12/2009 | Rijssemus et al. ............ 725/127 |
| 2010/0100918 | A1 * | 4/2010 | Egan et al. ..................... 725/111 |
| 2010/0125877 | A1 * | 5/2010 | Wells et al. ...................... 725/78 |
| 2010/0162340 | A1 * | 6/2010 | Riggsby .......................... 725/127 |
| 2011/0010749 | A1 * | 1/2011 | Alkan ........................... 725/127 |
| 2012/0159556 | A1 * | 6/2012 | Alkan ............................. 725/80 |
| 2013/0081096 | A1 * | 3/2013 | Wells et al. .................... 725/120 |
| 2013/0125193 | A1 * | 5/2013 | Wells ............................. 725/127 |

FOREIGN PATENT DOCUMENTS

EP         1505833        2/2005
WO     WO2010133884     11/2010

OTHER PUBLICATIONS

European Search Report dated Apr. 5, 2012 from European Application No. 11397514.8, 7 pages.
Gradl, "Analysis of Transmission-Line Signal Distribution to Multiple Ports", IEEE Transactions on Circuits and Systems, vol. 29, No. 4, Apr. 1, 1982, pp. 270-272.
Noll et al., "A Novel Integrated DPDT and 3-Way Active Splitter with a Unique Unpowered Loop Through State for Broadband Applications", Microwave Integrated Circuits Conference, Sep. 28, 2009, pp. 270-273.

* cited by examiner

*Primary Examiner* — Brian Pendleton
*Assistant Examiner* — Fernando Alcon
(74) *Attorney, Agent, or Firm* — Hollingsworth Davis, LLC

(57) ABSTRACT

A splitter circuit means for use with a CATV network comprising: a first signal input for receiving a CATV signal; a first splitter for splitting the CATV signal into a first split signal and a second split signal; a second signal input for receiving a MoCA signal; a second splitter for splitting the MoCA signal into a third split signal and a fourth split signal; a first diplex filter arranged to lowpass filter the first split signal and highpass filter the third split signal and to combine said filtered signals into a first combined signal to be supplied in a first output; and a second diplex filter arranged to lowpass filter the second split signal and highpass filter the fourth split signal and to combine said filtered signals into a second combined signal to be supplied in a second output.

11 Claims, 4 Drawing Sheets

SPLITTER/COMBINER FOR CATV NETWORKS

FIELD OF THE INVENTION

The present invention relates to communication in cable television (CATV) networks, and more particularly to a splitter/combiner suitable for CATV networks

BACKGROUND OF THE INVENTION

Nowadays most cable television (CATV) operators provide, in addition to traditional television services, also various IP-based data services by taking advantage of the fact that the cable network provides an existing transmission path for the transmission of data signals as well. On the other hand, CATV customers typically have an in-house coaxial cable network, thus providing an existing media for an in-house local area network. The reuse of the low loss, high screening, large bandwidth home coax networks enables to install a reliable data network at low installation cost.

For utilizing the existing coaxial cabling for in-home networking, various technologies have been developed. One of these technologies is called Multimedia over Coax Alliance (MoCA). A MoCA network is established by connecting MoCA-enabled or MoCA interface devices at the cable outlets in the rooms of the subscriber premises. These MoCA interface devices implement a MoCA communication protocol which encapsulates the signals normally used by the multimedia devices within MoCA signal packets and then communicates the MoCA signal packets between other MoCA interface devices connected at other cable outlets typically at the frequency range of 1125-1525 MHz.

A starting point of CATV network design is that all downstream/upstream communication goes to/from the headend of the CATV operator. Therefore, in order to prevent interference between the cable outlets, all communication between in-house terminals has been prevented by splitters providing high isolation of approximately 30 dB within the CATV frequency range of 5-1006 MHz. However, such a high isolation is an impediment for reliable MoCA communications between the in-house terminals.

WO2010/133884 aims to solve this problem by disclosing a splitter with low isolation, typically <17 dB, in the 1125-1525 MHz range. The splitter circuit of WO2010/133884 may be usable in the case of one splitter providing connection for two in-house terminals, but offers little improvement when more than two terminals are to be attached to the home coax network. If applied for four terminals (as in the FIG. 7 of WO2010/133884), the signal path could go to 37 dB (i.e. two times 10 dB insertion loss and 17 dB isolation) between ports on either end of the four-way splitter.

Moreover, since the CATV signal path and the MoCA signal path are implemented by common components for both signal paths, the optimisation of both paths leads inevitably to compromises in the performance of the CATV splitter part, as well. Thus, the CATV performance in the CATV part of the spectrum deteriorates to 6 dB insertion loss and typically 20 dB isolation.

The splitter circuit of WO2010/133884 is very sensitive to its input load. The isolation of the two-way and the four-way splitters could increase significantly in sub-ranges of the MoCA bandwidth and impede the proper operation of the link, or at least reduce its capacity.

SUMMARY OF THE INVENTION

Now an improved arrangement has been developed to alleviate the above-mentioned problems. As different aspects of the invention, there is provided a splitter circuit means and a signal splitter, which are characterized in what will be presented in the independent claims. The dependent claims disclose advantageous embodiments of the invention.

According to a first aspect, there is provided a splitter circuit means for use with a CATV network comprising: a first signal input for receiving a CATV signal; a first splitter for splitting the CATV signal into a first split signal and a second split signal; a second signal input for receiving a MoCA signal; a second splitter for splitting the MoCA signal into a third split signal and a fourth split signal; a first diplex filter arranged to lowpass filter the first split signal and highpass filter the third split signal and to combine said filtered signals into a first combined signal to be supplied in a first output; and a second diplex filter arranged to lowpass filter the second split signal and highpass filter the fourth split signal and to combine said filtered signals into a second combined signal to be supplied in a second output.

According to an embodiment, the first and second diplex filters comprise a lowpass filter having a passband of approximately 5-1006 MHz.

According to an embodiment, the first and second diplex filters comprise a highpass filter having a cut-off frequency of 1125 MHz and being designed to be complementary to said lowpass filter.

According to an embodiment, the first splitter for splitting the CATV signal has approximately 4 dB insertion loss at 1006 MHz, 25 dB return loss and 30 dB isolation over the frequency range of 5-1006 MHz.

According to an embodiment, the second splitter for splitting the MoCA signal comprises three resistors having resistance of approximately 25 Ohm.

According to a second aspect, there is provided a signal splitter comprising at least one, but preferably two splitter circuit means as described above arranged in parallel, wherein said first splitters for splitting the CATV signal of both of said two splitter circuit means are combined with a third splitter substantially similar to said first splitter; and said second splitters for splitting the MoCA signal are implemented as four parallel resistors, each connected to highpass filter inputs of said diplexer filters, said parallel resistors being further combined in series with a fifth resistor connected to said second signal input, said resistors having resistance of approximately 45 Ohm.

According to an embodiment, the signal splitter further comprises amplifier circuit means for providing bi-directional connection to the CATV network, said amplifier circuit means comprising a first circuit branch for providing a signal path for CATV downstream and upstream signals; and a second circuit branch for providing a signal path for CATV and MoCA downstream and upstream signals to/from a MoCA-compatible cable modem.

According to an embodiment, the first circuit branch comprises an amplifier for amplifying the CATV downstream signal; and a filtering arrangement allowing only the CATV downstream to pass to the amplifier According to an embodiment, the second circuit branch comprises a filtering arrangement separating the CATV downstream signals, the CATV upstream signals and MoCA signals in different branches.

According to an embodiment, the first and the second circuit branches are arranged to supply the CATV downstream signal to said first signal input of the splitter circuit means; and the second circuit branch is arranged to supply the MoCA signal to said second signal input of the splitter circuit means.

These and other aspects of the invention and the embodiments related thereto will become apparent in view of the detailed disclosure of the embodiments further below.

LIST OF DRAWINGS

In the following, various embodiments of the invention will be described in more detail with reference to the appended drawings, in which FIG. 1 shows an example of a MoCA/CATV network arrangement;

DESCRIPTION OF EMBODIMENTS

Figure 1:
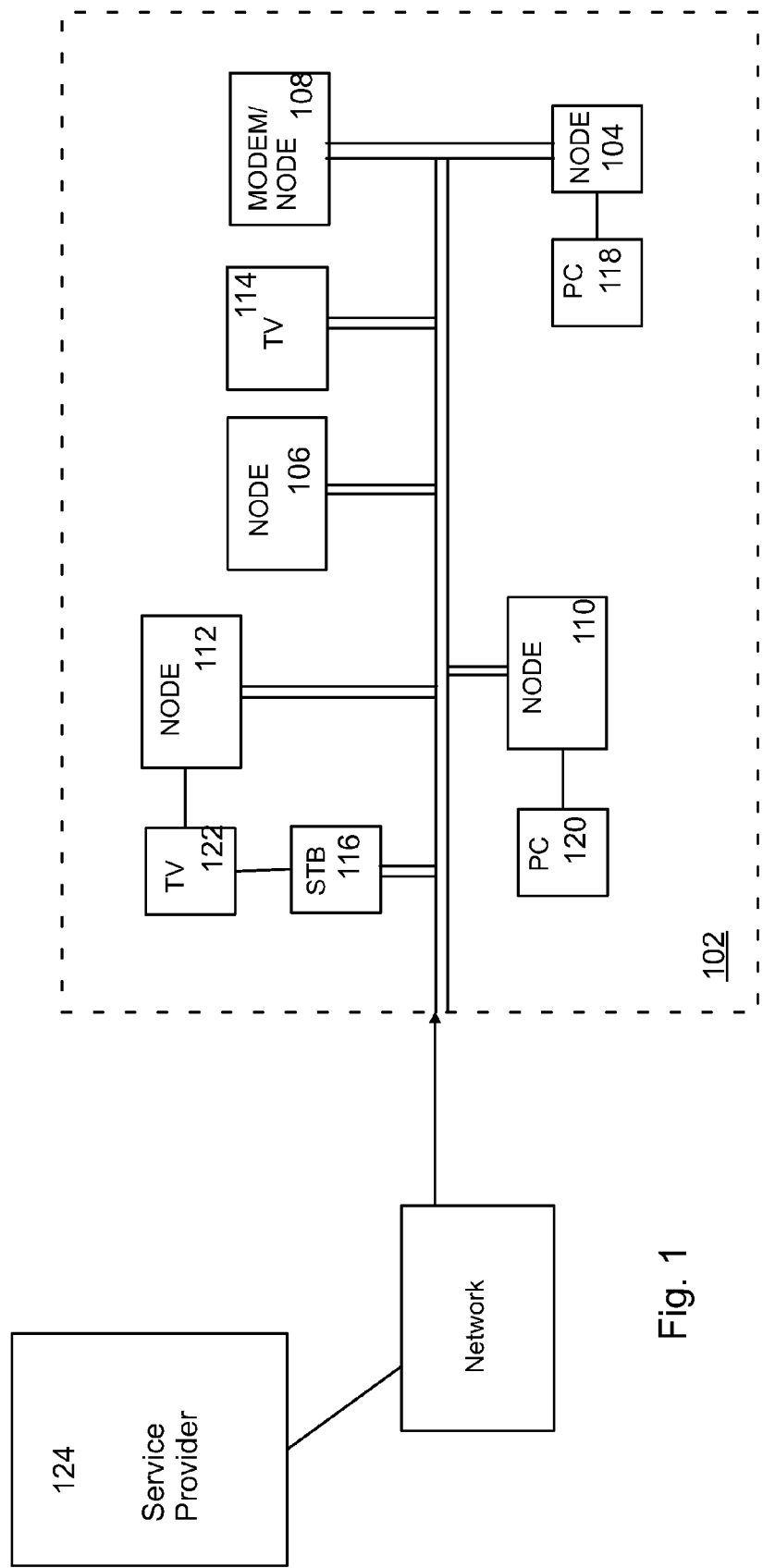

FIG. 1 shows an example of a MoCA/CATV network arrangement as an in-house implementation using a wired communications medium 100, wherein the communications medium 100 is preinstalled coaxial cabling deployed within a home of a subscriber 102. Nevertheless, the communications medium in a MoCA system is not limited to coaxial cable systems only, but it may be implemented in a power line system, a fiber optic cable system, an Ethernet cable system, or other similar communications medium. Alternatively, the communications medium may be a wireless transmission system, such as a WiFi or a WLAN system.

The network of FIG. 1 comprises a plurality of network nodes 104, 106, 108, 110, 112 in communication according to the MoCA communications protocol. The node 104 serves as a network communications module (i.e. a MoCA node) and is coupled to one of the computers 118, 120. Such nodes allow the computers 118,120 to communicate on the communications medium 100 in accordance with the MoCA communications protocol used on the medium 100. A node 112 is shown as a module associated with a television 122 to allow the television to receive and display media streamed from one or more other network nodes. Alternatively, the television 122 may be provided with media stream via a set-top-box 116, or a television 114 with an integral STB may be directly connected to the communications medium 100. Furthermore, a node might be associated with (i.e., coupled to or integrated into) a speaker or other music or video device 106. A node might also be associated with a module configured to interface with an internet or cable service provider 124, for example to provide Internet access, digital video recording capabilities, media streaming functions, or network management services to the home of the subscriber 102.

Accordingly, a MoCA node may supply signals to a plurality of subscriber equipments and/or other nodes, whereby typically a two-way splitter or a four-way splitter is used to split the incoming signal to feed the plurality of subscriber equipments, which split signals may be further split by another two-way/four-way splitter. The returning signals from the subscriber equipments are in turn combined in the splitters.

Figure 2:
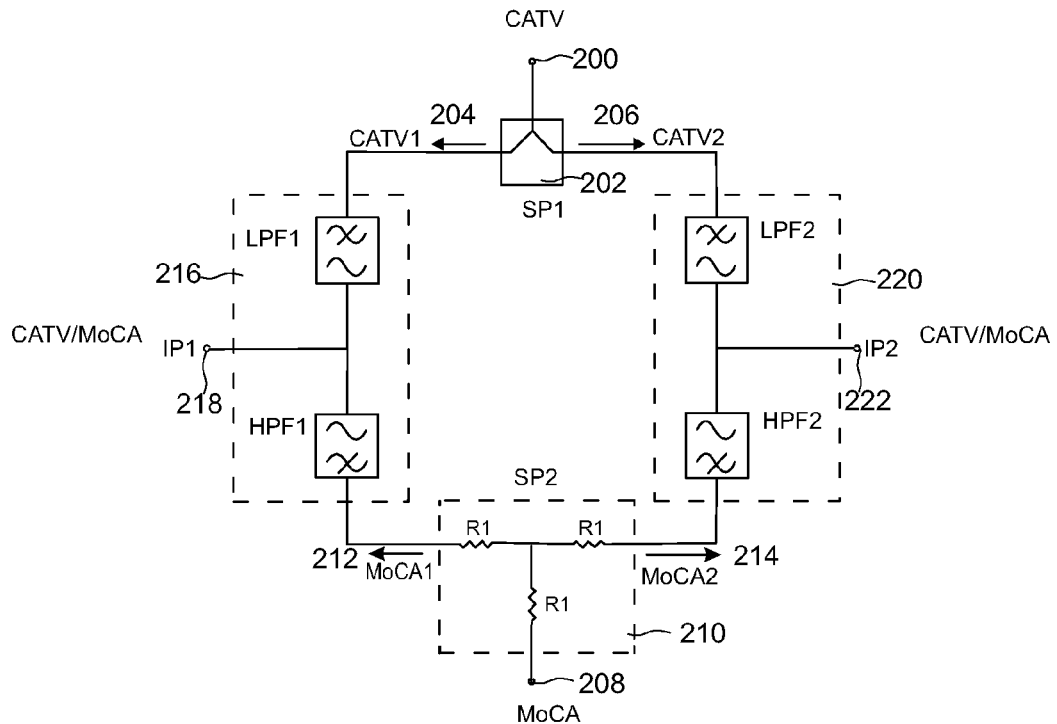
FIG. 2 shows a splitter/combiner according to an embodiment of the invention.

FIG. 2 shows an embodiment of a splitter/combiner according to the invention, which comprises a CATV splitter (SP1; 202), a resistive splitter (SP2; 210) for a MoCA network and two combining diplex filters 216, 218. A CATV signal, typically employing a frequency band of 5-1006 MHz, is supplied in a first input 200 of the splitter/combiner typically from a bidirectional CATV equipment, for example a TV/FM outlet or a home amplifier. The CATV splitter (SP1; 202), which is optimized for high performance on the 5-1006 MHz frequency range, splits the CATV signal into two signal paths CATV1 (204) and CATV2 (206).

The first split signal CATV1 (204) is supplied in a first diplexer filter 216, more particularly in a first lowpass filter LPF1 therein having a passband of approximately 5-1006 MHz, thereby being arranged to block any 1125-1525 MHz MoCA possibly appearing on the CATV network side. The lowpass filtered first signal CATV1 is connected to a first interactive port IP1 (218). In a similar manner, the second split signal CATV2 (206) is lowpass filtered in a second diplexer filter 220, more particularly by a second lowpass filter LPF2 with a similar passband of approximately 5-1006 MHz, and the lowpass filtered second signal CATV2 is connected to a second interactive port IP2 (222).

A MoCA signal, typically employing a frequency band of 1125-1525 MHz, is supplied in a second input 208 of the splitter/combiner typically from a MoCA equipment. The resistive splitter SP2 (210) having low isolation on said frequency range splits the MoCA signal into two signal paths, MoCA1 (212) and MoCA2 (214). The first split signal MoCA1 (212) is supplied in the first diplexer filter 216, more particularly in a first highpass filter HPF1 therein, which has a cut-off frequency of 1125 MHz and which designed to be complementary to the first lowpass filter LPF1. Thus, the first diplexer 216 comprising the first highpass filter HPF1 and the first lowpass filter LPF1 is preferably implemented as providing good return loss on the port IP1 (218) in both frequency ranges 5-1006 MHz and 1125-1525 MHz. In a similar manner, the second split signal MoCA2 (214) is supplied in the second diplexer filter 220, more particularly in a second highpass filter HPF2 designed to be complementary to the second lowpass filter LPF2, and thus forming the second diplexer 218.

The input impedance of a MoCA network is 75 Ohm. The resistive splitter SP2 (210) comprises three resistors R1 having theoretical value is $R=75/3=25$ ohms, the values of which can be fine-tuned in an implementation design, if necessary. The insertion loss between the input port 208 of the resistive splitter SP2 (MoCA port) and either of the interactive ports (IP1; 218 or IP2; 222) as well as the isolation between the interactive ports IP1 and IP2 is theoretically 6 dB. In practical implementations, 1-2 dB can be added to given values to take into account the insertion losses and parasitic elements in the 1125-1525 MHz range.

As becomes evident from this configuration, the processing of the CATV and the MoCA signals is made independent of each other. Thus, the CATV splitter SP1 can be optimised independently of the MoCA path, whereby no compromises in the performance of CATV splitter SP1 are needed, contrary to the prior art solution WO2010/133884 having common components for both signal paths. Therefore, high performance requirements for a CATV splitter, such as 4 dB insertion loss at 1006 MHz, 25 dB return loss and 30 dB isolation over the frequency range of 5-1006 MHz, are fulfilled.

Furthermore, since the CATV and the MoCA signals are processed independently, it is easy to limit or block MoCA signals on certain IP ports. In certain cases it would be advantageous to isolate IP ports from each other in order to prevent eavesdropping and ensure privacy.

For example, the resistive splitter SP2 can be replaced by a splitter having very high isolation on the frequency range of 1125-1525 MHz. This would allow MoCA links to be established between MoCA Port and IP1 or IP2 ports, but not between IP1 and IP2 ports. Alternatively, the branch between the resistive splitter SP2 and either of the highpass filters HPF1/HPF2 can be opened e.g. by a switch to block the MoCA link on the corresponding IP port.

It is also possible to replace the resistive splitter SP2 by a splitter circuit according WO2010/133884. In such implementation, the use of the CATV signal path could be disabled and the parameters of the RLC circuit could be adjusted such that splitter circuit is optimised for the MoCA signals in the frequency range of 1125-1525 MHz.

The above implementation in regard to FIG. 2 has been described with the presumption that the MoCA signals employ the frequency range of 1125-1525 MHz. However, there has been proposed also other frequency ranges to be used in MoCA communication. For example, a WAN (Wide area Network) MoCA ha been proposed, whose frequency range starts approximately from 950 MHz. Nevertheless, a similar splitter/combiner configuration as disclosed in FIG. 2 could still be used, but the passband of the CATV lowpass filters LPF should be arranged as about 5-862 MHz, whereas the cut-off frequency of the highpass filter HPF should be around 950 MHz. The resistive splitter SP2 can then be adjusted accordingly.

Figure 3:
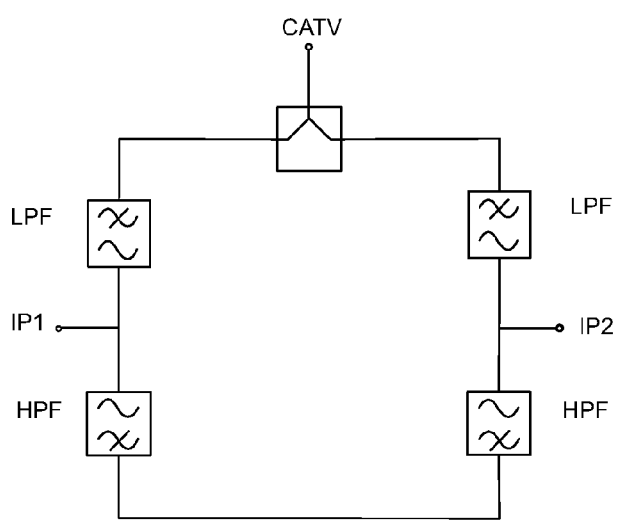
FIG. 3 shows a splitter/combiner according to another embodiment of the invention.

The splitter/combiner of FIG. 2 provides a basic building block for further embodiments of invention. The input port of the resistive splitter SP2 (MoCA port) is intended for an equipment without CATV signal but also for extending the configuration to have more interactive ports IP. However, in a case where only two CATV/MoCA ports (i.e. IP ports) are needed for connecting two terminals to each other via a in-house coaxial network, the resistive splitter SP2 can be removed, thereby connecting the first and second highpass filters HPF1 and HPF2 directly to each other. Thus, the theoretical insertion loss between the ports IP1 and IP2 is 0 dB. This embodiment is illustrated in FIG. 3.

Figure 4:
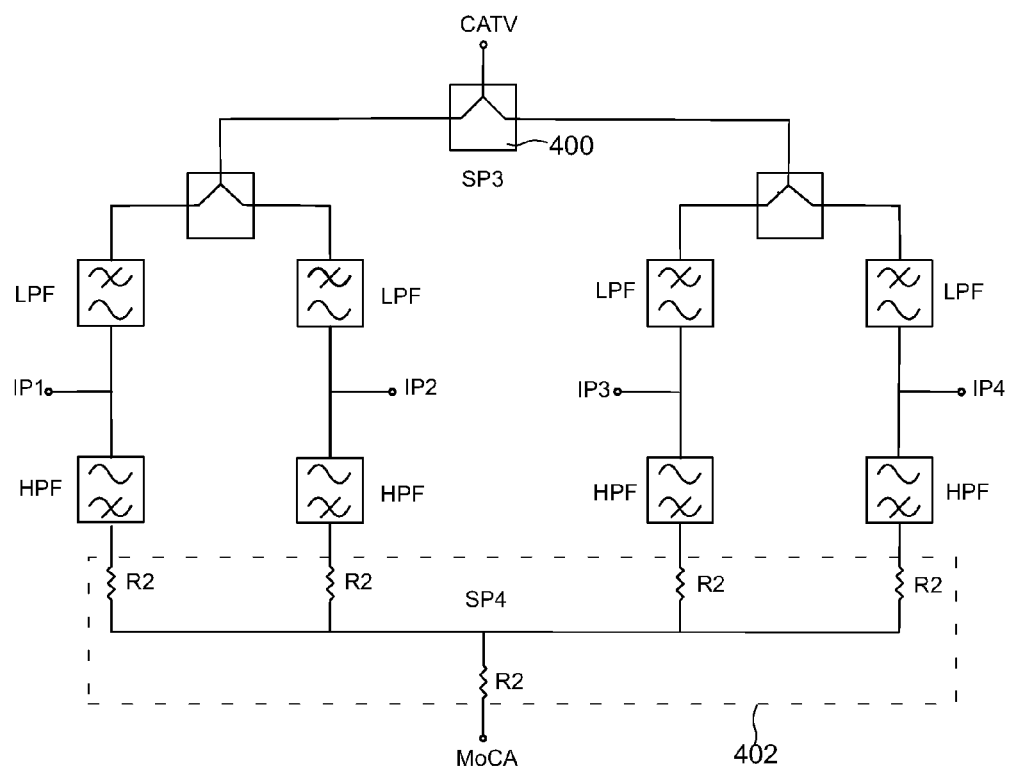
FIG. 4 shows yet another embodiment disclosing a combination of two splitter/combiners according to FIG. 2.

FIG. 4 shows another embodiment of the invention, wherein two splitter/combiners according to FIG. 2 have been combined in parallel between a CATV splitter (SP3; 400) and a resistive splitter (SP4; 402). The CATV splitter SP3 can be implemented as a similar high performance CATV splitter as the CATV splitter SP1. The CATV splitter SP3 splits the CATV signal into two signals, which both are supplied into similar CATV splitters, which in turn split the signals into two signals, resulting in total of four CATV signal paths. Each of these CATV signals are supplied in a lowpass filter LPF having a passband of approximately 5-1006 MHz, whereafter the lowpass filtered signals are connected to corresponding interactive ports IP1-IP4.

However, instead of implementing the resistive splitter SP4 as a mirror image to the CATV splitter SP3, i.e. as two parallel resistive (3-resistor) splitters like SP2 combined with one further resistive (3-resistor) splitter, the resistive splitter SP4 is preferably implemented as having a resistor in each IP branch, as shown in FIG. 4. This approach reduces the number of resistors and enables to reduce the isolation of MoCA signals between the IP ports. For example, instead of having 18 dB (3×6 dB) isolation between the interactive ports IP1 and IP3, an isolation of 12 dB is now achieved. The resistive splitter SP4 comprises five resistors R2 having a theoretical value of R=75×3/5=45 ohms, which can be fine-tuned, if necessary, in an implementation design for best performance.

Figure 5:
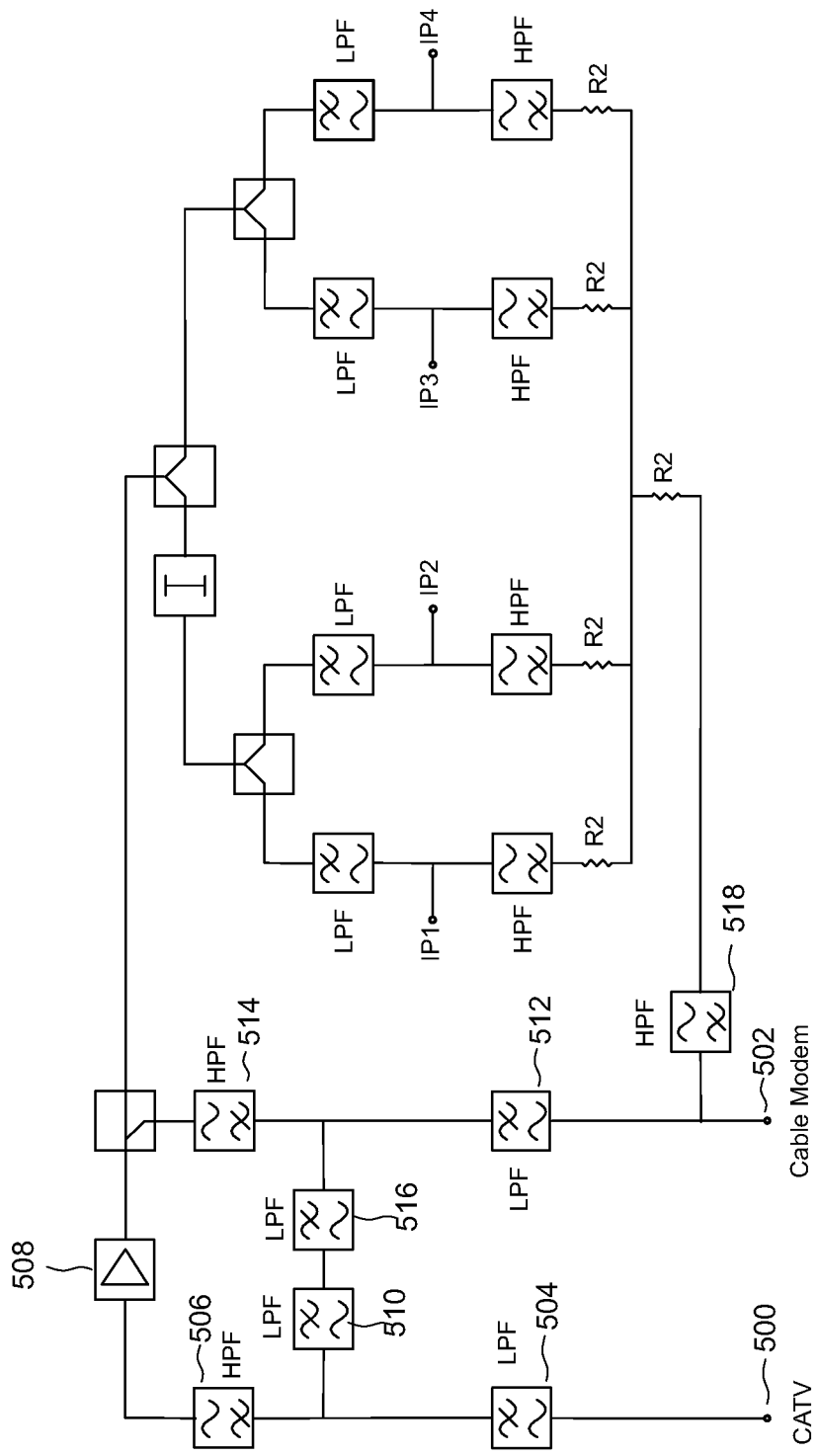
FIG. 5 shows a home amplifier with six ports according to an embodiment of the invention in a simplified block chart.

FIG. 5 shows yet another embodiment of the invention disclosing a home amplifier with six ports in a simplified block chart. The configuration of FIG. 4 provides a corner stone for the home amplifier, wherein the configuration of FIG. 4 has been extended by two additional ports 500, 502. A first port 500 is arranged to provide a downstream/upstream port for the CATV network. The branch from the first port comprises a first lowpass filter (LPF1; 504) having a passband of approximately 5-1006 MHz, thereby being arranged to block any signals outside the CATV frequency range and providing a total of 60-70 dB attenuation for MoCA signals possibly leaking from other branches, thus increasing data security. The branch further comprises a highpass filter 506 of 87-1000 MHz allowing only the downstream signals to pass to an amplifier 508 to be further amplified, and a second lowpass filter 510 of 5-65 MHz allowing only the upstream signals to pass to the other direction.

A second port 502 is intended for a MoCA-compatible cable modem preferably including a triplexer filter for separating the CATV upstream path (5-65 MHz), the CATV downstream path (85-1006 MHz) and the MoCA signal path (1125-1525 MHz). The CATV branch of the second port comprises, similarly to that of the first port, a first lowpass filter (LPF1; 512) of 5-1006 MHz for blocking the non-CATV frequency range, a highpass filter 514 of 87-1000 MHz for filtering the downstream signals, and a second lowpass filter 516 of 5-65 MHz for filtering the upstream signals. The MoCA signals are supplied, via a second highpass filter 518 of 1125-1525 MHz, into the resistive splitter (MoCA port) according to FIG. 4.

The interactive ports IP1, IP2, IP3 and IP4, having CATV downstream gain of 0 dB, 0 dB, 4 dB and 4 dB respectively, are intended for CATV/MoCA equipment. The theoretical isolation between all MoCA ports is 12 dB, and even with all insertion losses and parasitic elements taken into account it will not exceed 15 dB. This provides a very high margin even for long coaxial cabling causing significant cable losses and ensures sufficiently high MoCA data rate complying with the MoCA Specification, v2.0.

When a cable modem is connected to the second port, the return path (i.e. upstream 5-65 MHz) access of the network is limited to the home network. The interactivity between the terminals of the home network connected to the interactive ports IP1, IP2, IP3 and IP4 may then be managed over the MoCA communication protocol. Alternatively, any other technologies, such as Powerline-over-coax (PLC), WiFi-on-coax or fibre optics, may be utilised in the in-home communication. All of these technologies provide the advantage that there is no need to distribute the vulnerable return path in the home. Furthermore, when the return path is managed with one cable modem, the headend capacity of the CATV operator is spared by eliminating additional modems in the CATV network.

For operating the splitter circuit in connection with Wi-Fi-on-coax, no substantial changes in the configuration are required other than tuning the frequencies of highpass and lowpass filters appropriately. The PLC technology, in turn, is operated on rather low frequencies of about 5-25 MHz. Therein, the diplex filters should be turned around; i.e. highpass filters would be adjusted on the CATV side and having the cut-off frequency at about 87 MHz and lowpass filters would be adjusted on the PLC side and having the passband of 5-25 MHz.

Especially the FIGS. 2, 4 and 5 illustrate the benefits gained from the design based on the repetitive use of different basic blocks. The same basic configuration can be repetitively combined with a similar configuration and the combination of CATV and MoCA bandwidths is carried out by low order diplex filters, which are easy to tune. Furthermore, the MoCA splitter is implemented as purely resistive and the CATV splitter is easy to implement repetitively, and therefore the tuning of any of the configurations disclosed in FIGS. 2, 4 and 5 is very straightforward.

Compared to prior art, for example WO2010/133884, therein the values of the components, i.e. resistors, capacitors and inductors, are provided with several ranges, which have to be tuned according to the situation. Hence, already in the manufacturing phase the splitter should be tuned to accommodate high isolation for CATV signals and low isolation for MoCA signals. Especially in CATV splitter design, finding ferrites with the proper parameters and the right set-up thereof is a complicated, time consuming task with poor repeatability. Furthermore, the surrounding components require heavy parameterization and repeatability in this respect is not warranted.

A further manufacturing/testing advantage compared to the prior art is obtained from limitations of a typical industry standard multiport equipment for CATV testing. The frequency range of such a network analyzer with a multiport test set is limited to 1300 MHz. Fine tuning of splitters ranging from 5-1525 MHz, such as disclosed in WO2010/133884, would require a more expensive custom-made equipment. In any of the configurations disclosed in FIGS. 2, 4 and 5, an exact tuning of 1125 MHz highpass filter is not even critical for the design and since the MoCA splitter is resistive, i.e. highly repeatable, suitable for a very wide bandwidth and exactly matched, lower quality control costs are incurred in the manufacturing.

A skilled man appreciates that any of the embodiments described above may be implemented as a combination with one or more of the other embodiments, unless there is explicitly or implicitly stated that certain embodiments are only alternatives to each other.

It is obvious that the present invention is not limited solely to the above-presented embodiments, but it can be modified within the scope of the appended claims.

The invention claimed is:

1. A splitter circuit means for use with a CATV network comprising:
   a first signal input for receiving a CATV signal;
   a first splitter for splitting the CATV signal into a first split signal and a second split signal;
   a second signal input for receiving a MoCA signal;
   a second splitter for splitting the MoCA signal into a third split signal and a fourth split signal;
   a first diplex filter arranged to lowpass filter the first split signal and highpass filter the third split signal and to combine said filtered signals into a first combined signal to be supplied in a first output; and
   a second diplex filter arranged to lowpass filter the second split signal and highpass filter the fourth split signal and to combine said filtered signals into a second combined signal to be supplied in a second output.

2. The splitter circuit means according to claim 1, wherein the first and second diplex filters comprise a lowpass filter having a passband of approximately 5-1006 MHz.

3. The splitter circuit means according to claim 2, wherein the first and second diplex filters comprise a highpass filter having a cut-off frequency of 1125 MHz and being designed to be complementary to said lowpass filter.

4. The splitter circuit means according to claim 1, wherein the first splitter for splitting the CATV signal has approximately 4 dB insertion loss at 1006 MHz, 25 dB return loss and 30 dB isolation over the frequency range of 5-1006 MHz.

5. The splitter circuit means according to claim 1, wherein the second splitter for splitting the MoCA signal comprises three resistors having resistance of approximately 25 Ohm.

6. A signal splitter comprising at least one splitter circuit means according to claim 1.

7. The signal splitter according to claim 6, comprising two splitter circuit means arranged in parallel, wherein
   said first splitters for splitting the CATV signal of both of said two splitter circuit means are combined with a third splitter substantially similar to said first splitter; and
   said second splitters for splitting the MoCA signal are implemented as four parallel resistors, each connected to highpass filter inputs of said diplexer filters, said parallel resistors being further combined in series with a fifth resistor connected to said second signal input, said resistors having resistance of approximately 45 Ohm.

8. The signal splitter according to claim 7, further comprising
   amplifier circuit means for providing bi-directional connection to the CATV network, said amplifier circuit means comprising
   a first circuit branch for providing a signal path for CATV downstream and upstream signals; and
   a second circuit branch for providing a signal path for CATV and MoCA downstream and upstream signals to/from a MoCA-compatible cable modem.

9. The signal splitter according to claim 8, wherein the first circuit branch comprises
   an amplifier for amplifying the CATV downstream signal; and
   a filtering arrangement allowing only the CATV downstream to pass to the amplifier.

10. The signal splitter according to claim 8, wherein the second circuit branch comprises
   a filtering arrangement separating the CATV downstream signals, the CATV upstream signals and MoCA signals in different branches.

11. The signal splitter according to claim 8, wherein
   the first and the second circuit branches are arranged to supply the CATV downstream signal to said first signal input of the splitter circuit means; and
   the second circuit branch is arranged to supply the MoCA signal to said second signal input of the splitter circuit means.

* * * * *